United States Patent [19]

Van Breda

[11] Patent Number: 5,561,700
[45] Date of Patent: Oct. 1, 1996

[54] DEVICE FOR MEASURING ANALOG TELEPHONY SIGNALS

[75] Inventor: Lodewijk M. Van Breda, Amersfoort, Netherlands

[73] Assignee: Koninklijke PTT Nederland N.V., Netherlands

[21] Appl. No.: 261,005

[22] Filed: Jun. 16, 1994

[30] Foreign Application Priority Data

Jun. 23, 1993 [NL] Netherlands ............................ 9301094

[51] Int. Cl.$^6$ ............................ H04M 1/24; H04M 3/08; H04M 3/22
[52] U.S. Cl. .................... 379/1; 379/24; 379/27; 379/28; 379/29; 379/30; 379/31
[58] Field of Search ..................... 379/1, 24, 27, 379/28, 29, 30, 31, 377, 381, 382, 386; 370/13, 17, 110.3

[56] References Cited

U.S. PATENT DOCUMENTS

| | | | |
|---|---|---|---|
| 4,270,024 | 5/1981 | Theis | 379/381 |
| 4,276,447 | 6/1981 | Shirasu | 379/382 |
| 4,528,664 | 7/1985 | Cheng | 370/110.3 |
| 4,736,933 | 3/1988 | Barsellotti | 379/24 |
| 4,860,332 | 8/1989 | Chism | 329/1 |
| 4,962,520 | 10/1990 | Gozen | 379/29 |
| 5,070,526 | 12/1991 | Richmond | 379/377 |
| 5,109,409 | 4/1992 | Bomgardner | 379/377 |
| 5,299,257 | 3/1994 | Fuller | 379/1 |
| 5,343,461 | 8/1994 | Barton | 370/13 |

FOREIGN PATENT DOCUMENTS

| | | |
|---|---|---|
| 0200038 | 7/1992 | European Pat. Off. . |
| 2932788 | 3/1980 | Germany . |

*Primary Examiner*—Stephen Chin
*Assistant Examiner*—Vijay Shankar
*Attorney, Agent, or Firm*—Michaelson & Wallace; Peter L. Michaelson

[57] ABSTRACT

A device, for digitally measuring in real-time analog telephony signals appearing on a subscriber line during a telephone call thereover, having a converter for converting analog subscriber line voltages into corresponding digital samples, a memory for storing a number of these samples and a processor which resides in any one of various states. For each such state, the processor generates at least one different mask condition, the condition being a limit value of a pre-defined characteristic of at least a particular one of the stored digital samples relative to other such samples. The processor occupies various states with the selection of any one of these states depending upon a particular previous and/or subsequent history of the line voltages with respect to that call, i.e. the state of the call. The processor checks whether some of the stored digital samples satisfies the mask condition. If the condition is satisfied, the device has recognized the digital samples as being a particular converted analog voltage. Only a small number of stored digital samples is required for a test with a mask condition and only a small number of mask condition is needed to identify each such signal, thus permitting one device to provide real-time measurements for a relatively large number of different subscriber lines.

19 Claims, 4 Drawing Sheets

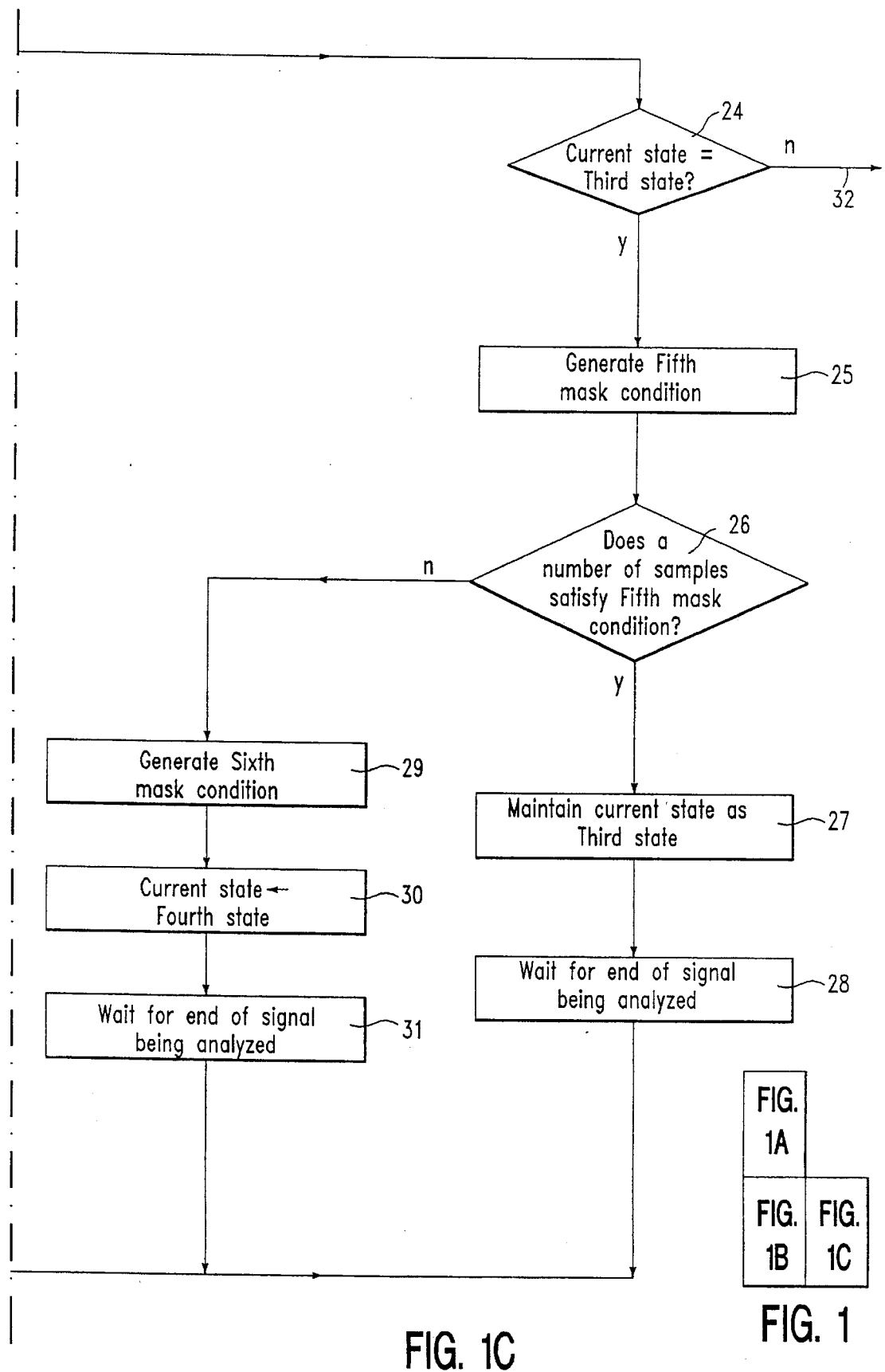

DEVICE FOR MEASURING ANALOG TELEPHONY SIGNALS

BACKGROUND OF THE INVENTION

The invention relates to a device for measuring analog telephony signals, provided with
- a converter, which can be linked to a subscriber line, for converting analog voltages present on the subscriber line into digital samples,
- a memory, linked to the converter, for storing a number of digital samples,
- a processor linked to the memory.

A device of this type is disclosed by EP 0 200 038 B1. The device; described herein measures analog voltages which are present on the line of a digital telephony system by converting these analog voltages, by means of the converter, into digital samples which are then stored in the memory. The processor checks, for each new sample, whether this is larger than the largest previously stored sample, in which case the largest previously stored sample is replaced by the new larger sample, or whether the new sample is smaller than the smallest previously stored sample, in which case, likewise, smallest the previously stored sample is replaced by the new smaller sample. Thus, after a certain time interval, a maximum and a minimum are found which form the actual maximum and minimum of all the samples taken during the particular time interval, and from which, based on a mathematical formula, new values are derived. A known device of this type has the drawback that it is designed in principle for locating faults, and that it is in principle unsuitable for real-time measuring of analog telephony traffic. It presents the problem that the determination of the actual maximum and minimum during the particular time interval is completely inadequate for analysing and interpreting very complex analog telephony traffic (involving ringing pulses, dialing pulses and billing pulses subject to considerable tolerances and, in general, pulses which look identical at first sight but may have a different previous and/or subsequent history).

SUMMARY OF THE INVENTION

One of the objects of the invention is to provide a device through which analog telephony traffic can the analyzed and interpreted in real time.

To this end, the device according to the invention is characterized in that the processor is able to be in at least two states, generates, for each state, at least one mask condition, and checks whether at least a part of the number of stored digital samples satisfies this mask condition.

As a result of the processor being able to be in at least two states, it is capable of interpreting differently two pulses which look identical to one another but have a different previous and/or subsequent history, the previous or subsequent history determining what state the processor is in. The generation, for each state, of at least one mask condition, and the subsequent checking, whether at least a part of the number of stored digital samples satisfies this mask condition, provides an option of testing the part of the digital samples for certain properties, without the possibility of tolerances lying within certain limits affecting these tests. The generation of a separate mask for each part of the digital samples which has one unique tolerance anywhere, or a unique combination of tolerances, would obviously lead to an unacceptably large number of different masks, which would make real-time analysis and interpretation impossible. By means of the above, which represents an insight into the invention, the previously mentioned problem is solved in an advantageous manner.

The invention is based on a further insight, that the real-time analysis and interpretation of, for example, digital samples stored in a shift register should take place quickly, since a digital sample is available for at most a time equal to the cycle of a clock pulse multiplied by the length of the shift register, and that any previous and/or subsequent history can no longer be derived, in the process, from the digital samples stored in the shift register but rather the state the processor is in should be involved in the analysis and interpretation of the digital samples.

Although a considerable increase of the length of the shift register, or the fixed-location storage, during a certain time, of a much larger number of digital samples could make a contribution to the solution of the problem, this would, at the same time, lead to an unacceptable increase in the processor capacity required and to disadvantageously larger memories required. Moreover, in this case it is no longer possible to speak of real-time analysis and interpretation.

A first embodiment of the device according to the invention is characterized in that the processor changes its state, in response to a comparison result in one sense in the case of a mask condition of a first type, remains in its current state, in response to a comparison result in another sense, and also remains in its current state, in response to a comparison result in one sense in the case of a mask condition of a second type.

If a comparison result in one sense corresponds to a part of the number of stored digital samples satisfying a certain mask condition, and a comparison result in another sense corresponds to a part of the number of stored digital samples not satisfying a certain mask condition, the processor, in the case of a comparison result in another sense (i.e. if a mask condition is not satisfied) will in general remain in the same state, while the processor, in the case of a comparison result in one sense (i.e. if a mask condition is satisfied) will, depending on the type of mask condition, remain in the same state or change state.

Obviously, the processor assigns, both in the case of a comparison result in one sense and of a comparison result in another sense, certain values to certain auxiliary variables, which values depend on the comparison result. If, for example, after a third analysis/interpretation a third dialing pulse is registered, while in two previous analyses/interpretations the first and the second dialing pulse were registered, it will be necessary to assign, after the third analysis, the value three to a certain auxiliary variable, since the total number of dialing pulses is a criterion for a number dialed by a subscriber and therefore should be kept up to date.

A second embodiment of the device according to the invention is characterized in that the processor is designed for detecting a change between digital samples stored earlier and subsequently, and for generating a change signal in response to a detected change.

This involves more efficient usage of the processor capacity, as a result of the processor starting to generate a mask condition only after the change signal occurs, and thus not being continuously (unnecessarily) busy in checking whether at least a part of a number of stored digital samples satisfies one or more mask conditions.

Detection of the change may be effected, for example, by mutual comparison of two successive digital samples situated within the number of stored digital samples. It is also possible to mutually compare two larger sets of digital samples.

A third embodiment of the device according to the invention is characterized in that the processor starts a timespan signal and generates an overshoot signal in response to a time threshold being exceeded by the timespan signal.

Allowing the processor, in response to the overshoot signal occurring after the timespan signal has exceeded the time threshold, to return to a reset state or rest state, prevents the processor from spending an unnecessarily long amount of time in a particular state on analyzing non-relevant samples; thus, making it possible to detect signals that fail to appear.

The terms "timespan signal", "overshoot signal" and "threshold signal" should be understood in the widest possible sense in this context. Implementation thereof can be effected either completely by means of software or completely by means of hardware or by means of a mix thereof. It is also possible, counting upwards, to detect the overshooting of a threshold, while counting downwards, for example, to detect the reaching of a zero value detected.

A fourth embodiment of the device according to the invention is characterized in that a mask condition relates to a periodicity within the number of stored digital samples.

By checking the periodicity of a part of the stored digital samples it is possible to find out whether these digital samples originate, for example, from a ringing signal.

A fifth embodiment of the device according to the invention is characterized in that a mask condition relates to a number of stored digital samples.

By checking, with respect to a part of the stored digital samples, whether a particular number of samples is concerned here, it is possible to find out whether these digital samples originate, for example, from a receiver-off-hook signal or from an engaged signal.

A sixth embodiment of the device according to the invention is characterized in that a mask condition relates to a length of a smaller number of stored digital samples which is located within the number of stored digital samples.

By checking the length of a smaller number of stored digital samples situated within the part of the stored digital samples, it is possible to find out whether these digital samples originate from a dialing pulse signal.

It should be noted that the device according to the invention has been designed for measuring telephony signals, but that this device is obviously also suitable for measuring, for example, telex signals and video signals. The term "telephony signal" should consequently also be understood in the widest possible sense and therefore in general relates to a signal containing data which, as it flows past, is analysed and interpreted in real time by the device according to the invention.

BRIEF DESCRIPTION OF THE DRAWINGS

The invention will be explained in more detail with reference to a specific embodiment depicted in the figures, in which:

FIGS. 1A, 1B and 1C show a flow diagram of the mode of operation of a processor 80 from device 100 according to the invention, both of these elements being depicted in FIG. 4, FIG. 4 shows a simplified high-level block diagram of device 100 which embodies the present invention.

DETAILED DESCRIPTION

Figure 1A:
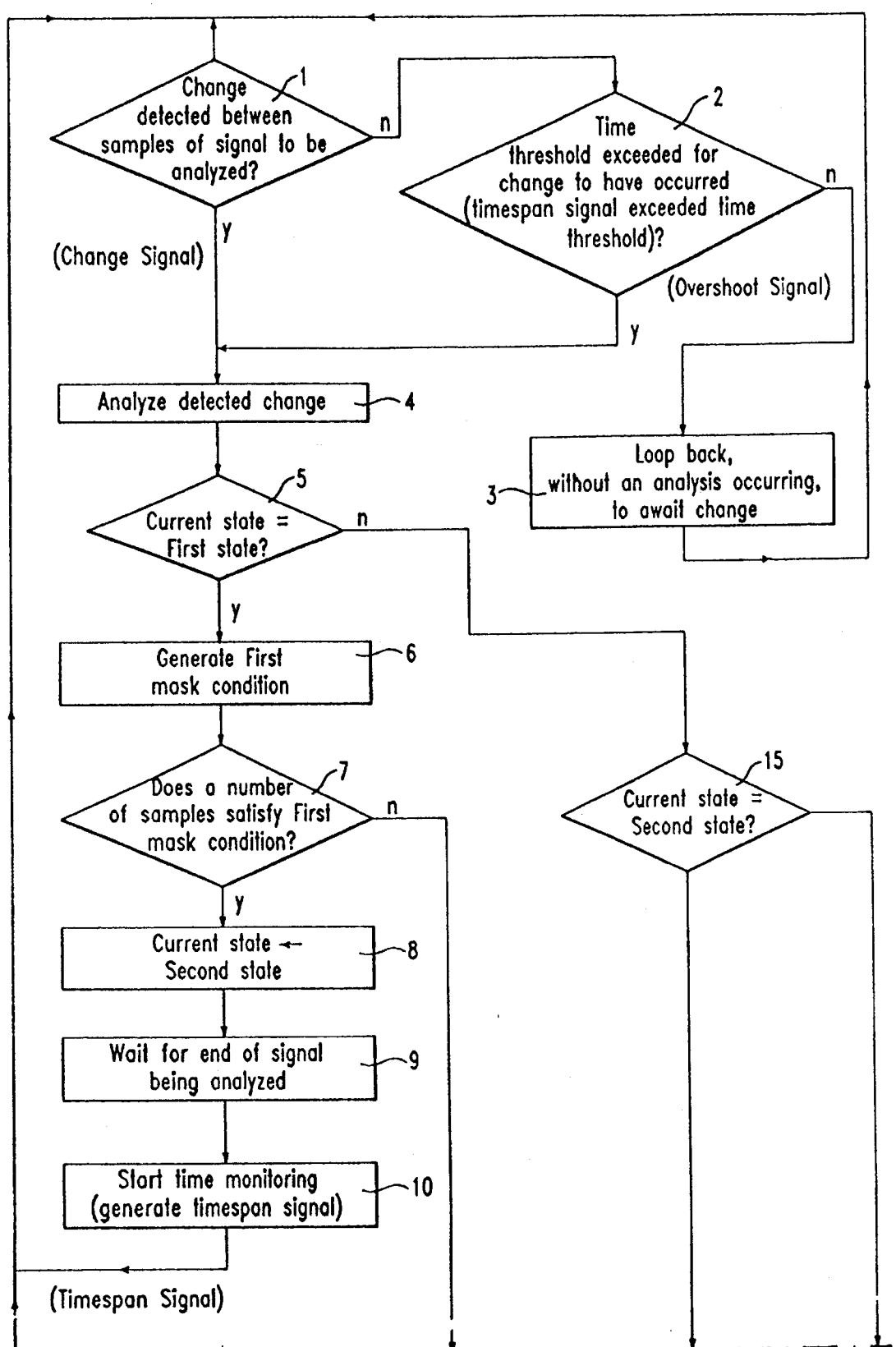
Figure 1B:
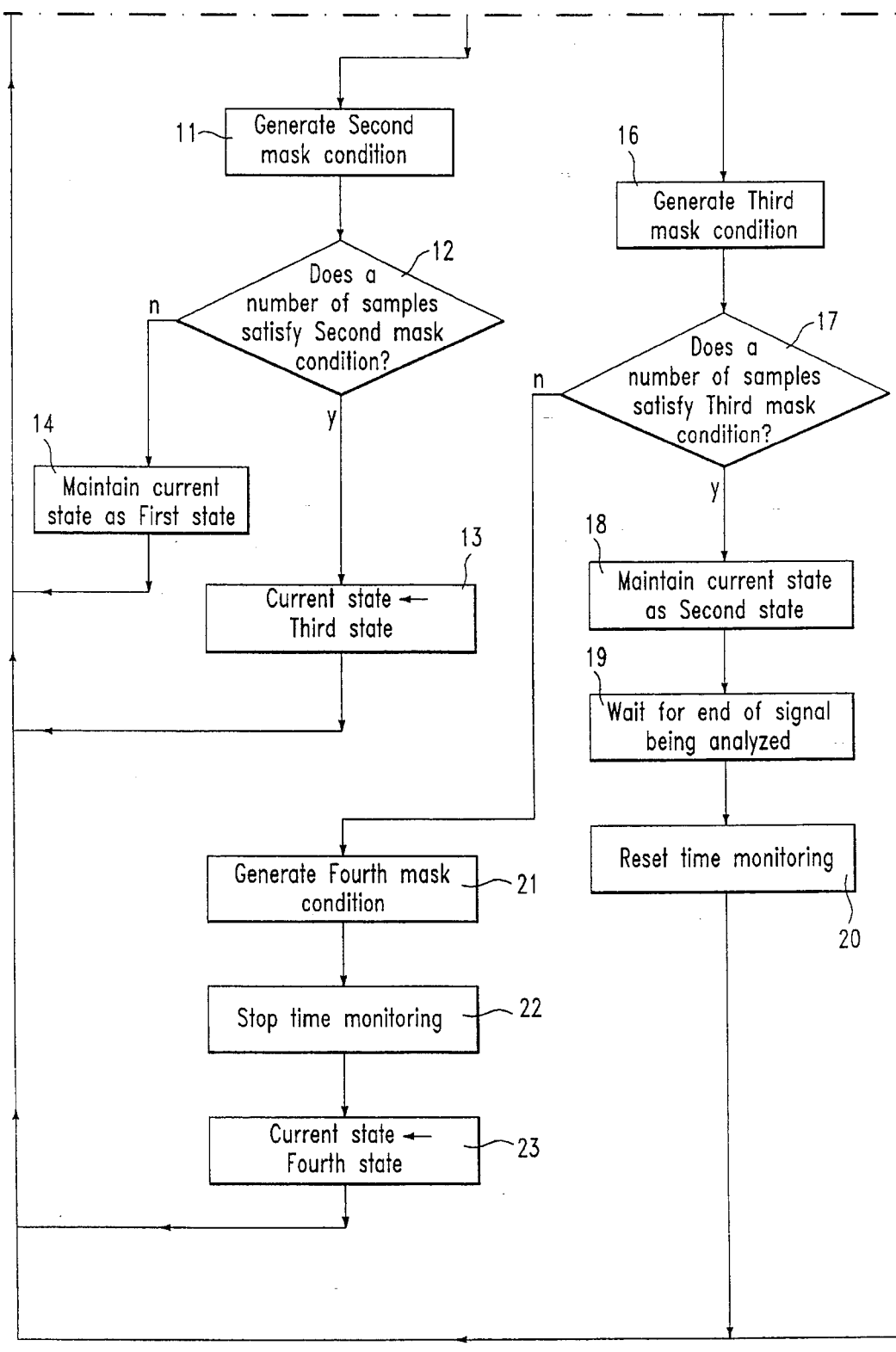

In the flow diagram, depicted in FIGS. 1A, 1B and 1C, of the mode of operation of a processor from a device according to the invention, the boxes have the following meaning:

| Box | Meaning |
| --- | --- |
| 1 | has a change in detection been detected? |
|   | if yes: go to box 4 |
|   | if no: go to box 2 |
| 2 | is it a matter of time having been exceeded? |
|   | if yes: go to box 4 |
|   | if no: go to box 3 |
| 3 | no analysis follows (as yet), |
|   | return to box 1 |
| 4 | an analysis follows |
| 5 | is the processor in a first state? |
|   | if yes: go to box 6 |
|   | if no: go to box 15 |
| 6 | generate first mask condition |
| 7 | does a number of samples satisfy first mask condition? |
|   | if yes: go to box 8 |
|   | if no: go to box 11 |
| 8 | transition to second state |
| 9 | wait for end of signal |
| 10 | start time monitoring |
|   | return to box 1 |
| 11 | generate second mask condition |
| 12 | does a number of samples satisfy second mask condition? |
|   | if yes: go to box 13 |
|   | if no: go to box 14 |
| 13 | transition to third state, |
|   | back to box 1 |
| 14 | remain in first state |
|   | back to box 1 |
| 15 | is the processor in a second state? |
|   | if yes: go to box 16 |
|   | if no: go to box 24 |
| 16 | generate third mask condition |
| 17 | does a number of samples satisfy third mask condition? |
|   | if yes: go to box 18 |
|   | if no: go to box 21 |
| 18 | remain in second state |
| 19 | wait for end of signal |
| 20 | reset time monitoring |
|   | return to box 1 |
| 21 | generate fourth mask condition |
| 22 | stop time monitoring |
| 23 | transition to fourth state |
|   | return to box 1 |
| 24 | is the processor in a third state? |
|   | if yes: go to box 25 |
|   | if no: go to box 32 (not shown in FIG. 1) |
| 25 | generate fifth mask condition |
| 26 | does a number of samples satisfy fifth mask condition? |
|   | if yes: go to box 27 |
|   | if no: go to box 29 |
| 27 | remain in third state |
| 28 | wait for end of signal |
|   | return to box 1 |
| 29 | generate sixth mask condition |
| 30 | transition to fourth state |
| 31 | wait for end of signal |
|   | return to box 31 |

The processor functions as follows, according to the flow diagram depicted in FIG. 1A, 1B and 1C, the flow diagram being implemented through, e.g. conventional programming techniques well known to those skilled in the art. A regular check is carried out whether a change has taken place between samples stored earlier and subsequently (box 1), for example by determining the difference of these samples. If a change has taken place, there follows an analysis (box 4), and if no change has taken place (as yet), a check is carried out whether it is a matter of time having been exceeded (box 2), for example by checking, with respect to a time signal started for the purpose of time monitoring, whether it has exceeded a certain limit. If this is not the case, no analysis follows as yet (box 3), and if it is indeed the case, an analysis follows (box 4).

For analyzing purposes, first of all a check is carried out whether the processor is in a first state (box 5), the so-called rest state. This is done, for example, by looking up the value of a state parameter in a processor memory. If the processor is in the first state, a first mask condition is generated (box 6), which will be dealt with in more detail hereinafter, and the processor checks whether a certain number of samples satisfy this first mask condition (box 7). If they do satisfy it, the processor jumps to a second state (box 8), for example by increasing the value of the state parameter. The processor further waits for the end of the signal to be analyzed (box 9), and the time monitoring is started (box 10), whereupon a check is again carried out for a change between samples stored earlier and subsequently (box 1). If the certain number of samples does not satisfy the first mask condition, a second mask condition is generated (box 11), which will be dealt with in more detail hereinafter, and the processor checks whether a certain number of samples satisfy this second mask condition (12). If they do satisfy it, the processor jumps to a third state (box 13), for example by further increasing the value of the state parameter, whereupon a check is carried out for a change between samples stored earlier and subsequently (box 1). If the certain number of samples does not satisfy the second mask condition, the processor remains in the first state, whereupon check is carried out for a change between samples stored earlier and subsequently (box 1).

If the processor is not in the first state, a check is carried out whether the processor is in the second state (box 15). This is effected, for example, by looking up the value of the state parameter in the processor memory. If the processor is in the second state, a third mask condition is generated (box 16) which will be dealt with in more detail hereinafter, and the processor checks whether a certain number of samples satisfy this third mask condition (box 17). If they do satisfy it, the processor remains in the second state (box 18). The processor further waits for the end of the signal to be analysed (box 19), and the time monitoring is reset (box 20) whereupon a check is carried out for a change between samples stored earlier and subsequently (box 1). If the certain number of samples does not satisfy the third mask condition, a fourth mask condition is generated (box 21) which will be dealt with in more detail hereinafter. In addition, the processor stops the time monitoring (box 22), and the processor jumps to a fourth state, for example by further increasing the value of the state parameter. Afterwards, a check is carried out for a change between samples stored earlier and subsequently (box 1).

If the processor is not in the second state (box 15), a check is carried out whether the processor is in the third state (box 24). This is effected, for example, by looking up the value of the state parameter in the processor memory. If the processor is in the third state, a fifth mask condition is generated (box 25) which will be dealt with in more detail hereinafter, and the processor checks whether a certain number of samples satisfy this fifth mask condition (box 26). If they do satisfy it, the processor remains in the third state (box 27). The processor further waits for the end of the signal to be analyzed (box 28), where upon a check is carried out for a change between samples stored earlier and subsequently (box 1). If the certain number of samples does not satisfy the fifth mask condition, a sixth mask condition is generated (box 29) which will be dealt with in more detail hereinafter. In addition, the processor jumps to a fourth state (box 30), for example by further increasing the value of the state parameter. Afterwards the processor waits for the end of the signal to be analyzed (box 31) and a check then is carried out for a change between samples stored earlier and subsequently (box 1).

Figure 2:
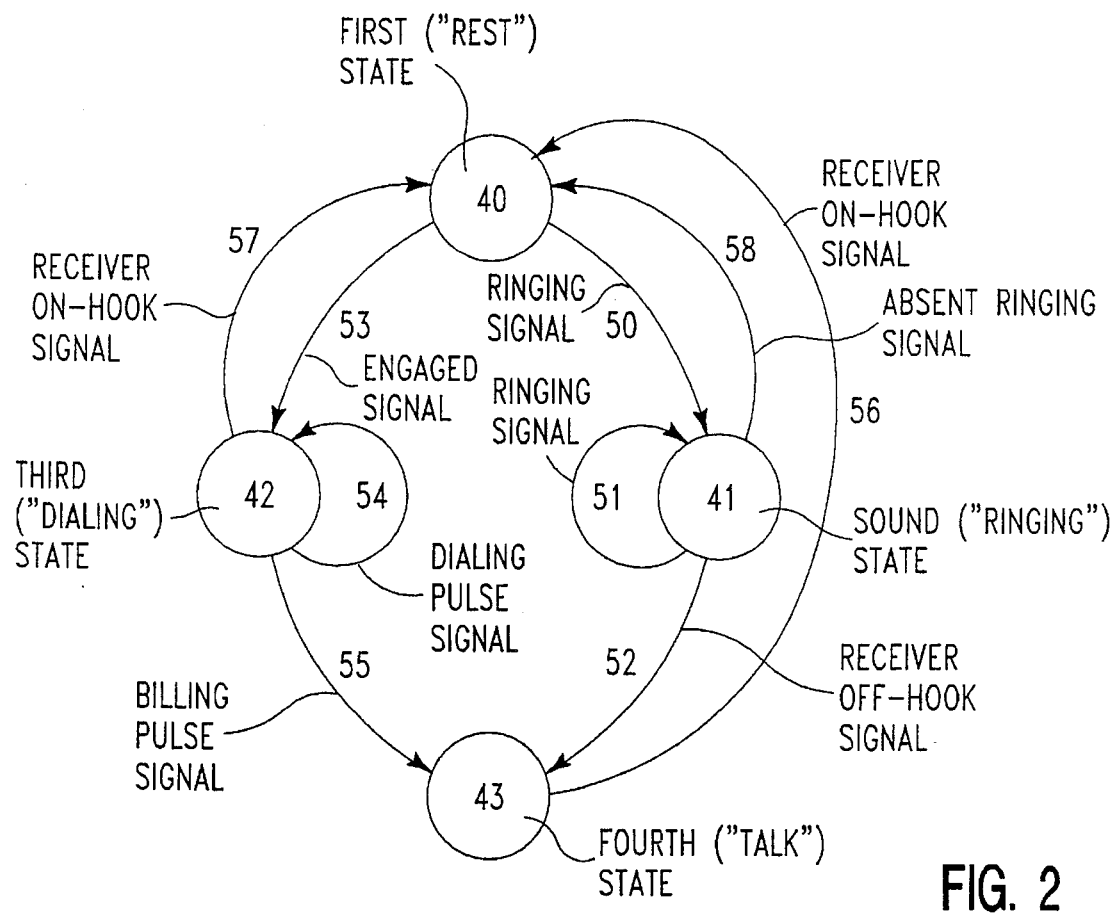
FIG. 2 shows a state diagram of processor 80 from device 100 according to the present invention, FIGS. 3*a*, *b*, *c* shows a number of digital samples stored in memory 70, with respect to which samples processor 80 checks to determine whether these samples satisfy a mask condition.

In the state diagram, depicted in FIG. 2, of a processor from a device according to the invention (specifically processor 80 in device 100 shown in FIG. 4), a first state 40 show in FIG. 2 corresponds to a rest state, a second state 41 corresponds to a ringing state, a third state 42 corresponds to a dialing state, and a fourth state 43 corresponds to a talk state. From the first state 40, a jump is made, in response to the detection of a ringing signal 50, to the second state 41. From the second state 41 a jump is made, in response to the detection of a receiver-off-the-hook signal 52, to the fourth state 43, while in response to a ringing signal 51 the system remains in the second state 41. From the first state 40, a jump is made, in response to the detection of an engaged signal 53, to the third state 42. From the third state 42, a jump is made, in response to the detection of a billing pulse signal 55, to the fourth state 43, while in response to a dialing pulse signal 54, the system remains in the third state 42. From the second state 41 the system returns, in response to an absent ringing signal 58, to the first state 40, and from the third state 42 and fourth state 43 the system returns, in response to the detection of receiver-on-the-hook signal 57 and 56, respectively, to the first state 40.

Figure 3A:
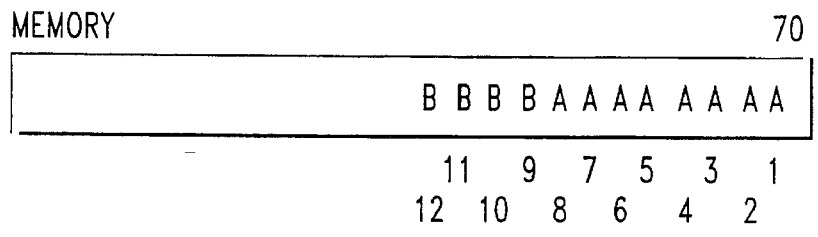

FIG. 3a depicts a section of a memory 70 which may comprise twenty-four samples, of which twelve samples are depicted, the first eight samples as, for example, bytes of type A and the following four samples as, for example, bytes of type B (under normal conditions, a memory of this type will contain around forty bytes, each having a duration of approximately 5 msec and thus a total of roughly 200 msec). In this case, a sample corresponds to a byte, but obviously it would also be possible for a sample to correspond to a portion of a byte. Each byte corresponds to eight bits, three bits indicating a DC voltage value, while five bits correspond to a particular tone. Such a byte consisting of eight bits is derived, in a manner known to those skilled in the art, from a telephony signal via a first comparator linked to an a wire (which compares with a first reference level), via a second comparator linked to a b wire (which compares with a second reference level), via a third comparator which is linked to both wires, via a so-called TDK recognition chip and via a so-called 12/16 kHz billing pulse recognition chip which are all linked to a programmable logic device (Programmable Array Logic or PAL) all of which is collectively shown as converter 60 in FIG. 4. This logic generates, in response to the signals originating from the comparators, the TDK chip and the 12/16 chip, an output signal which comprises eight bits and which is sampled subsequently. This sampled output signal of serial bytes is stored in the memory 70 (such as, for example, a shift register as shown in FIG. 4). The interpretation of samples depends on the state the processor is in (specifically processor 80 shown in FIG. 4), and on the relative instant at which they are examined, specifically as follows.

When in the first state (the rest state), the processor generates the second mask condition (box 11 in FIG. 1B), if a first mask condition is not satisfied. A simplified version of this second mask condition is, for example:

| I | is a first byte of type A?<br>if no: go to I.<br>if yes: go to II. |
|---|---|
| II | is a following byte of type B?<br>if no: go to II.<br>if yes: go to second state. |

If the processor generates this second mask condition with the memory contents as depicted in FIG. 3a, it will be established as early as at the first byte (A) that this is of type A. To this end, the processor generates, for example, a byte of type A and compares this with the stored bytes, for example by determining the difference which, in the case of agreement, is equal to the value zero. It is then established of the following seven bytes (As) that they are not of type B (to this end, the processor generates, for example, a byte of type B and compares this with the stored bytes, for example by determining the difference, which in the case of non-agreement is not equal to the value zero), while with regard to the ninth byte (B) it is indeed established that this is of type: B. In response thereto there follows a transition of the processor to the second state (the ringing state, box 8 in FIG. 2).

Figure 3B:
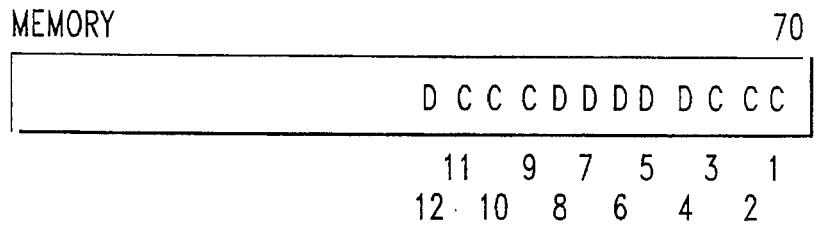

FIG. 3b shows a section of a memory 70 which comprises twelve bytes, the first three bytes of type C, the following five bytes of type D, then three bytes of type C and one byte of type D.

When in the first state (the rest state) or in the second state (the ringing state), the processor generates the first (box 6 in FIG. 1A) or the third mask condition (box 16 in FIG. 1B). These are equal to one another and a simplified version is, for example:

| III | is a first byte of type C?<br>if no: go to V.<br>if yes: augment count state and go to IV. |
|---|---|
| IV | is a following byte of type C?<br>if yes: augment count state and go to IV.<br>if no: go to V. |
| V | is a following byte of type D?<br>if yes: augment count state and go to V.<br>if no: go to VI. |
| VI | is count state equal to the value eight?<br>if yes: go to third state.<br>if no: count state gets the value zero, and go to III. |

If the processor generates this first or third mask condition with the memory contents shown in FIG. 3b, it will be established as early as for the first byte (C) that this is of type C. To this end the processor generates, for example, both a byte of type C and a byte of type D and compares both bytes with the stored bytes, for example by determining the difference, which difference in the case of agreement is equal to the value zero and in the case of non-agreement is not equal to the value zero. It is then established of the following two bytes (Cs) that they are likewise of type C, and it is established of the following five bytes that they are of type D, while of the ninth byte (C) it is again established that this is of type C. When a total of eight bytes of type C and D have been found, there follows a transition of the processor from the first to the second state (the ringing state, box 8 in FIG. 1A), or the processor remains in the second state (box 18 in FIG. 1B). The reason for this is that a ringing signal (25 Hz) has a period of 40 msec, which corresponds to eight bytes of type C and D, and that either for a distribution of three Cs and five Ds or a distribution of four Cs and four Ds or a distribution of five Cs and 3 Ds it is decided that a ringing signal is present.

Figure 3C:
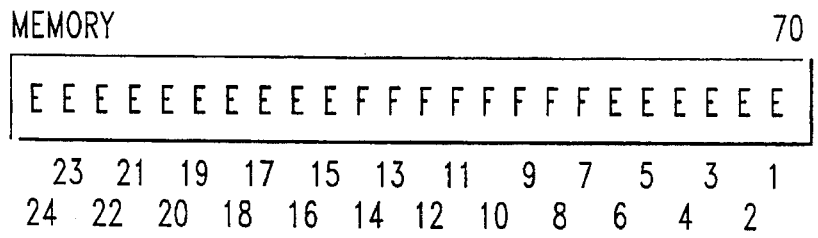

FIG. 3c shows a section of a memory 70 which comprises twenty-four bytes, the first six bytes of type E, the following eight bytes of type F, then ten bytes of type E.

When in the third state (the dialing state), the processor generates the fifth mask condition. A simplified version is, for example:

| VII | is a first byte of type E?<br>if yes: augment E count state and go to VIII.<br>if no: go to VII. |
|---|---|
| VIII | is a following byte of type E?<br>if yes: augment E count state and go to VIII.<br>if no: go to IX. |
| IX | is a following byte of type F?<br>if yes: augment F count state and go to IX.<br>if no: go to X. |
| X | is 7 ≦ F count state ≦ 9?<br>if yes: augment dialing pulse count state and go to VII<br>if no: go to XI. |
| XI | is E count state ≧ 20?<br>if yes: store dialing pulse count state as a figure, all count states get the value zero, go to VII.<br>if no: only the E and F count states get the value zero, go to VII. |

If the processor generates this fifth mask condition with the memory contents shown in FIG. 3c, it will be established as early as for the first byte (E) that this is of type E. To this end the processor generates, for example, both a byte of type E and a byte of type F and compares both bytes with the stored bytes, for example by determining the difference, which difference the case of agreement is equal to the value zero and in the case of non-agreement is not equal to the value zero. It is then established of the following five bytes (Es) that they are likewise of type E, and it is established of the following eight bytes that they are of type F, while of the fifteenth byte (E) it is again established that this is of type E etc. When a total of seven, eight or nine bytes of type F have been established, the dialing pulse count state is augmented, but not otherwise, since a dialing pulse has a duration of at least 35 msec and at most 45 msec. Thus, a total number of dialing pulses is established, which number is representative for a figure dialed by a subscriber. Since the maximum duration between two dialing pulses belonging to the same series of dialing pulses is approximately 100 msec, it is assumed, in the case of more than twenty bytes of type E, that the series of dialing pulses has terminated.

When in the second state (the ringing state), the processor generates the fourth mask condition (box 21 in FIG. 1B) which, for example, corresponds roughly to the second mask condition, and whereupon a transition of the processor to the fourth state (the talk state, box 23 in FIG. 1B) follows automatically.

When in the third state (the dialing state), the processor generates the sixth mask condition (box 29 in FIG. 1C) which, for example, apart from twice as high a frequency and thus twice as short a cycle time, corresponds to the first and the third mask condition, and whereupon a transition of the processor to the fourth state (the talk state, box 30 in FIG. 1C) follows automatically.

The first, third and sixth mask conditions relate to a periodicity within a number of stored samples, while the fifth mask condition relates to a length of a smaller number of stored samples which is located within a larger number of stored samples. The second and the fourth mask condition relate only to a transition within a number of stored samples.

In practice, it will not, however, be possible to react to every transition, in connection with interference pulses, but instead it will only be permissible to react to a transition consisting of a minimum number of samples, in which case the two last mentioned mask conditions relate to a (length of a) number of stored samples.

Finally it should be noted that a processor in reality obviously rarely waits (as box 9, 19, 28 and 31 in FIGS. 1A, 1B and 1C might suggest), but instead of waiting will often continue with other things such as, for example, with analyses of other lines.

I claim:

1. In a device for measuring analog telephony signals occurring on a subscriber line during a telephone call said device having: a converter, linked to the subscriber line, for converting analog voltages present on the subscriber line into a stream of digital samples; a memory, linked to the converter, for storing the stream of digital samples; and a processor, linked to the memory, said processor existing in a plurality of different states; a method comprising the steps of:

in the processor:
   generating a state parameter;
   assuming a first state within the plurality of different states in response to the state parameter assuming a first value and assuming a second state within the plurality of different states in response to the state parameter assuming a second value, wherein said first and second values represent corresponding states of said telephone call;
   generating, for each one of the different states in said plurality of different states, at least one mask condition, said mask condition being a limit value of a pre-defined characteristic of at least a particular one of the digital samples, said particular one of the digital samples situated in a corresponding location within the stream of the digital samples, and with said characteristic being relative to other ones of the digital samples situated within the stream; and
   checking whether at least a pre-defined first number of said digital samples in said stream satisfies the mask condition so as to form a comparison result and so identify an analog telephone signal represented by said stream of digital samples.

2. The method in claim 1 further comprising the steps of:
   setting a value of the state parameter equal to a pre-defined value in response to the comparison result being a first pre-determined result and occurring from a first pre-defined mask condition;
   maintaining the state parameter at a current value in response to the comparison result being a second pre-determined result and occurring from the first pre-defined mask condition; and
   maintaining the state parameter at a current value in response to the comparison result being said first pre-determined result but occurring from a second pre-defined mask condition, wherein said first and second mask conditions are different from each other.

3. The method in claim 1 further comprising the steps of:
   detecting a change between successive ones of the first number of the digital samples in said stream so as to signify a detected change therein;
   generating a change signal in response to the detected change; and
   setting the state parameter equal to a pre-determined value in response to the change signal.

4. The method in claim 1 further comprising the steps of:
   starting a timespan signal;
   generating an overshoot signal in response to a time threshold being exceeded by the timespan signal; and
   setting the state parameter equal to a known value in response to the overshoot signal.

5. The method in claim 3 further comprising the steps of:
   starting a timespan signal;
   generating an overshoot signal in response to a time threshold being exceeded by the timespan signal; and
   setting the state parameter equal to a known value in response to the overshoot signal.

6. The method in claim 3 wherein the pre-defined characteristic is a periodicity at which the particular one digital sample occurs within the first number of the digital samples.

7. The method in claim 4 wherein the pre-defined characteristic is a periodicity at which the particular one digital sample occurs within the first number of the digital samples.

8. The method in claim 5 wherein the pre-defined characteristic is a periodicity at which the particular one digital sample occurs within the first number of the digital samples.

9. The method in claim 3 wherein the pre-defined characteristic is a number of times the particular one digital sample occurs within the first number of digital samples.

10. The method in claim 4 wherein the pre-defined characteristic is a number of times the particular one digital sample occurs within the first number of digital samples.

11. The method in claim 5 wherein the pre-defined characteristic is a number of times the particular one digital sample occurs within the first number of digital samples.

12. The method in claim 3 wherein the pre-defined characteristic is a number of times the particular one digital sample occurs within a pre-defined second number of said digital samples contained within the first number of digital samples.

13. The method in claim 4 wherein the pre-defined characteristic is a number of times the particular one digital sample occurs within a pre-defined second number of said digital samples contained within the first number of digital samples.

14. The method in claim 5 wherein the pre-defined characteristic is a number of times the particular one digital sample occurs within a pre-defined second number of said digital samples contained within the first number of digital samples.

15. Apparatus for measuring analog telephony signals occurring on a subscriber line during a telephone call, said apparatus having: a converter, linked to the subscriber line, for converting analog voltages present on the subscriber line into a stream of digital samples; a memory, linked to the converter, for storing the stream of digital samples; and a processor, linked to the memory, said processor existing in a plurality of different states; said apparatus further comprising:
    means for generating a state parameter;
    means for assuming a first state within the plurality of different states in response to the state parameter assuming a first value and for assuming a second state within the plurality of different states in response to the state parameter assuming a second value, wherein said first and second values represent corresponding states of said telephone call;
    means for generating, for each different one of the states in said plurality of different states, at least one mask condition, said mask condition being a limit value of a pre-defined characteristic of at least a particular one of the digital samples, said particular one of the digital samples situated in a corresponding location within the stream of the digital samples, and with said characteristic being relative to other ones of the digital samples situated within the stream; and means for checking whether at least a pre-defined first number of said digital samples in said stream satisfies the mask condition so as to form a comparison result and so identify an analog telephone signal represented by said stream of digital samples.

16. The apparatus in claim 15 further comprising:

means for setting a value of the state parameter equal to a pre-defined value in response to the comparison result being a first pre-determined result and occurring from a first pre-defined mask condition;

means for maintaining the state parameter at a current value in response to the comparison result being a second pre-determined result and occurring from the first pre-defined mask condition; and means for maintaining the state parameter at a current value in response to the comparison result being said first pre-determined result but occurring from a second pre-defined mask condition, wherein said first and second mask conditions are different from each other.

17. The apparatus in claim 15 further comprising:

means for detecting a change between successive ones of the first number of the digital samples in said stream so as to signify a detected change therein;

means for generating a change signal in response to the detected change; and means for setting the state parameter equal to a pre-determined value in response to the change signal.

18. The apparatus in claim 15 further comprising: means for starting a timespan signal;

means for generating an overshoot signal in response to a time threshold being exceeded by the timespan signal; and means for setting the state parameter equal to a known value in response to the overshoot signal.

19. The apparatus in claim 17 further comprising:

means for starting a timespan signal;

means for generating an overshoot signal in response to a time threshold being exceeded by the timespan signal; and means setting the state parameter equal to a known value in response to the overshoot signal.

\* \* \* \* \*